Patented May 25, 1937

2,081,890

UNITED STATES PATENT OFFICE 2,081,890

METHOD OF REFINING ROSIN

Joseph N. Borglin, Wilmington, Del., assignor to Hercules Powder Company, Wilmington, Del., a corporation of Delaware No Drawing. Application December 27, 1933, Serial No. 704,133

25 Claims. (Cl. 87—2)

This invention relates to a process of purifying rosin, particularly wood rosin and the lower grades of gum rosin.

As is well known, wood rosin and the lower grades of gum rosin cannot be used for many industrial purposes without a refining treatment. This unsuitability is caused by the presence of color bodies, especially latent color bodies. Latent color bodies may be present in a rosin freed from visible color bodies and will cause darkening on aging of the rosin or compositions containing it such, for example, as soaps in which latent color bodies darken due to the presence of alkali. The unrefined rosin is especially unsuitable for use in making rosin soaps, since the soap produced from an unrefined wood rosin or low grade gum rosin, even if initially light in color, will discolor on aging and assume a curious banded appearance and/or be of unsatisfactory color.

Various processes of refining rosin by the removal of color bodies therefrom are known, as, for example, treatment with selective solvents, distillation under various conditions, etc. One method of refining wood rosin involves distillation of the rosin in the presence of a boron compound, such as boric acid, as is fully described in my United States Patent No. 1,849,537.

Now it has been found in accordance with this invention that the reaction product between the color bodies, both visible and latent, and a suitable boron compound such as, for example, boric acid, sodium tetraborate, boric anhydride, boron trifluoride, boron triacetate, etc. is insoluble in solvents for rosin, and that a purified rosin may accordingly be obtained by treating unrefined rosin with a boron compound such as, for example, boric acid, sodium tetraborate, boric anhydride, boron trifluoride, boron triacetate, etc., and then removing the reaction product from the treated rosin by filtration or by extraction with a rosin solvent.

More particularly, the method in accordance with this invention is carried out by treating the impure rosin with a suitable boron compound, for example, boric acid, at a temperature of from 100 to 225° C. for a period of from one minute to one hour. I prefer, however, to use a temperature of about 125–150° C. and to treat for not longer than fifteen minutes. The amount of boric acid or other boron compound which may be used varies from 0.01 to 10% of the amount of rosin to be refined, preferably from about 0.01 to about 3%. The treating may be conducted in air, but is preferably conducted in an inert atmosphere as, for example, under carbon dioxide or nitrogen gas. Any suitable boron compound may be used as, for example, boric anhydride, sodium tetraborate, boric acid, boron hydride, boron triacetate, or the like. After the rosin has been treated sufficiently with the boron compound, the rosin is cooled and then dissolved in a solvent for rosin, for example, gasoline, petroleum ether, pinene, dipentene, benzol, toluol, etc. preferably, though not essentially, the solvent will be used in amount to form a solution containing about 14% rosin.

After permitting the insoluble products of the treatment to settle, the solution is decanted or filtered and then evaporated to recover the purified rosin.

Alternatively the rosin may be treated directly in solution in one of the solvents named above, for example, gasoline, by adding the desired quantity of a suitable boron compound, and heating the solution at a temperature of about 125–150° C. under the pressure so generated as in an autoclave for about an hour. The solution will preferably be agitated during the heating period. Following this treatment the solution will be filtered or decanted for the removal of the insoluble reaction products.

Thus, for example, 500 parts of FF rosin solution in gasoline to give a 15% solution are treated with about 1 part of boric acid and the solution is then heated with agitation in an autoclave at a temperature of about 150° C. for about one hour. The cooled solution is then filtered and evaporated to recover the refined resin.

When treatment with a gaseous boron compound, as boron trifluoride, is practiced, certain changes in procedure, especially in the reacting temperature, must necessarily be made. Treatment with boron trifluoride will be conducted at a temperature preferably below 50° C. and desirably at about 10° C. to 30° C. The time of treatment will desirably be short, and several short treatments—about one minute each—are preferred to a single treatment of equivalent total duration.

Thus, for example, 300 parts of FF wood rosin dissolved in gasoline (13% concentration) are given a one minute treatment with $BF_3$, by passing the gas through the solution at about 22° C. The solution is then filtered and the filtrate again treated with $BF_3$ for one minute. The treated solution is again filtered, water washed at about 22° C. and the solvent evaporated under reduced pressure. An 85.4% yield of I+ rosin may be obtained, with an acid number of about 160.

As a further example, 300 parts of FF wood rosin dissolved in gasoline as above are given three one-minute treatments with $BF_3$ as above. The solution is filtered after each treatment and finally water washed before evaporating under reduced pressure. A 63.5% yield of X+ rosin may be obtained.

It will be seen the time of treatment is short. The step of filtration between the separate treatments is highly desirable, as is the step of water washing prior to evaporation of the solvent.

It will be readily understood that no particular form of apparatus is required for carrying out the process in accordance with my invention, and that particular quantities, temperatures, or periods of treating are not of the essence of my invention, but that I broadly contemplate forming, by the interaction of a boron compound such as boric anhydride, sodium tetraborate, boric acid, boron triacetate, boron trifluoride, etc. and the color bodies contained in the rosin, a material insoluble in rosin solvents, and the subsequent removal of this insoluble material by any suitable means such as filtration of a solution of the treated rosin in a rosin solvent, decantation, etc.

The purified rosin produced in accordance with this invention will be found to grade lighter in color than rosin not so treated and will produce a soap which does not discolor to as great an extent as the soap produced from untreated rosin. For special uses, however, where a highly purified rosin is desired, it will be found advantageous to subject rosin purified as described above to a subsequent refining action.

I have found that the combination two-step refining treatment involving a preliminary treatment with a boron compound as described above, and a subsequent treatment by any of the well known processes of refining rosin, such as, for example, treatment with a selective solvent for color bodies as furfural, phenol, liquid $SO_2$ etc., treatment with adsorbents as activated carbon, silica gel, etc., treatment with alkylamines followed by regeneration of the rosin, treatment with alcoholic oxalic acid solution, or treatment by distillation in vacuum or in an inert atmosphere, will, contrary to expectation, give a refining action considerably greater than that which would be expected from the mere additive effects of each treatment singly. That is, I have found that there is a definite interrelation between the refining action using a boron compound and other refining actions, such as are obtained by the treatments outlined above, which results in producing a refined rosin superior in quality to any heretofore produced.

Processes for the refining of rosin with a selective solvent are described in, among others, United States Patents 1,715,084, 1,715,085, and 1,715,088 to Kaiser and Hancock, and 1,715,083, 1,715,086, 1,800,834, and 1,890,086 to Humphrey. Processes involving purification of rosin by distillation under various conditions are described in, among others, United States Patents 1,832,864 to Humphrey and 1,820,298 to Butts.

If the complete refining treatment involves pretreatment with a suitable boron compound as described above, and subsequent treatment of the rosin in solution, it will obviously not be necessary to evaporate the rosin solution obtained after decantation or filtration from the insoluble matter resulting from treatment with a boron compound, but the rosin solution immediately after filtration or decantation may be treated with any desired refining agent in accordance with, for example, the processes using selective solvents described in the patents mentioned above. If the subsequent refining treatment involves distillation, the purified rosin obtained after treatment with a boron compound will be placed in any suitable apparatus for distillation in accordance, for example, with any of the processes involving distillation disclosed in the patents cited above.

In some cases it may be found desirable to wash the rosin solution after removal of insoluble reaction products several times with water before subjecting the rosin to further refining treatment as described above.

As illustrative of my invention involving treatment with a boron compound alone, 200 grams of FF wood rosin and 1 gram of boric acid are heated for 15 minutes at about 150° C. in an atmosphere of carbon dioxide. The material, after cooling, is then dissolved in gasoline to make a solution of about 14% concentration, the solution filtered, and the gasoline evaporated to obtain a purified rosin grading F.

As further illustrative of my invention involving the use of a two-step or composite refining process, 300 grams of the filtered gasoline solution of rosin described in the example above may be washed once with 30 grams of furfural, and four times with 7 grams of furfural for each wash. The gasoline solution after separation from the furfural may be evaporated to obtain a purified rosin grading H in a yield of 84%. A soap made from this purified rosin will after aging for eight days be lighter in color than a soap made from an M grade of wood rosin obtained by other refining methods.

As further illustrative of my invention involving two-step procedure, 200 grams of FF wood rosin and 4 grams of boric acid are heated for fifteen minutes at about 200° C. in an atmosphere of carbon dioxide. The material after cooling is dissolved in gasoline to give to it a concentration of about 14%. After permitting the insoluble matter to settle, the solution is decanted, and 300 grams of the solution are washed once with 30 grams of 85% phenol and four times with 7 grams each of 85% phenol. A 69% yield of a purified rosin grading H is obtained. A soap made from this rosin after aging twenty-nine days is comparable in appearance with a soap made from an I grade of wood rosin refined by treatment with, for example, furfural.

Further by way of example, 200 grams of FF wood rosin are heated for about ten minutes with 0.5 g. boric acid at about 150° C. in an atmosphere of carbon dioxide. The treated rosin is then dissolved to 14% concentration in gasoline and filtered from the insoluble matter formed in the reaction with boric acid. Three 200 g. portions of the filtered gasoline solution are washed countercurrently with three 15 g. portions of furfural, followed by six 10 g. portions of fresh furfural. Upon removal of the gasoline refined rosins were obtained as follows:

| Lot | Yield | Color |
| --- | --- | --- |
| | % | |
| 1 | 70 | K− |
| 2 | 73.5 | M+ |
| 3 | 76.6 | I |

Soaps manufactured from these refined rosins are lighter in color, even after aging, than soaps made from an M wood rosin refined by other methods, and are superior to soaps made from N gum rosin.

As further illustrative of my invention involving a two-step process of refining, 500 grams of the gasoline solution of rosin referred to in the second example above are, after decantation, evaporated for the recovery of rosin therefrom, and this rosin distilled under reduced pressure in any suitable form of apparatus. There will be obtained a rosin grading X+ in color, and a soap produced from this rosin will, after aging for twenty-nine days, be extraordinarily light in color with no perceptible band and directly comparable to soap made from an I grade of gum rosin.

As further illustrative of the two-step process in accordance with this invention, 500 grams of a gasoline solution of rosin which has been treated as described above with a suitable boron compound are contacted with about 2–5%, based on the rosin content of the solution, of activated carbon, silica gel, or fuller's earth for a period of from 1–8 hours. Upon evaporation of the solution following this treatment a rosin grading I or better will be obtained.

The rosin produced by the process involving my invention will be superior to rosin obtained by any other refining process for, while other processes may produce a rosin having the same color grade as rosin produced by my process, it will be found that the soaps produced from rosin when refined in accordance with my invention will be lighter in color and will not darken so much on aging as will soaps produced from rosins of the same color grade refined by another process, and will have all the characteristics of a soap made from gum rosin. It will be understood that broadly my invention involves a treatment of rosin with a suitable boron compound such as boric anhydride, sodium tetraborate, boric acid, boron trifluoride, etc., followed, after removal of the insoluble reaction products, when a very high grade of rosin is desired, by any one of the other well known processes for refining rosin, as, for example, distillation, treatment with a selective solvent, various other refining treatments referred to above, etc. It is to be noted, however, that usually my refining treatment with a boron compound cannot be used with equal advantages subsequent to a refining treatment by distillation or with a selective solvent. It appears that the treatment with a boron compound in accordance with my invention in some manner operates to greatly increase the effectiveness of subsequent refining operations.

The method of refining rosin by treatment of the rosin with boron trifluoride as hereinbefore disclosed is not specifically claimed in this application since such method forms the subject matter of and is specifically claimed in my co-pending application, Serial No. 57,064, filed December 31, 1935, as a continuation in part of the present application.

What I claim and desire to protect by Letters Patent is:

1. The method of refining rosin which includes heating rosin with a boron compound at a temperature of about 100°–225° C. whereby a reaction product, insoluble in rosin solvents, of the boron compound and color bodies contained in the rosin is produced, dissolving the treated rosin in a solvent therefor, separating the rosin solution from insoluble material, and recovering refined rosin from the solution.

2. The method of refining rosin which includes heating rosin with boric acid at a temperature of at least 100° C. whereby a reaction product, insoluble in rosin solvents, of boric acid and color bodies contained in the rosin is produced, dissolving the treated rosin in a solvent therefor, separating the rosin solution from insoluble material, and recovering refined rosin from the solution.

3. The method of refining rosin which includes heating wood rosin with boric acid at a temperature of at least 100° C. whereby a reaction product, insoluble in rosin solvents, of boric acid and color bodies contained in the rosin is produced, dissolving the treated rosin in a solvent therefor, separating the rosin solution from insoluble material, and recovering refined wood rosin from the solution.

4. The method of refining rosin which includes heating rosin with boric acid at a temperature of about 100°–225° C. whereby a reaction product, insoluble in rosin solvents, of boric acid and color bodies contained in the rosin is produced, dissolving the treated rosin in a solvent therefor, separating the rosin solution from insoluble material, and recovering refined rosin from the solution.

5. The method of refining rosin which includes heating rosin with boric acid in an inert atmosphere at a temperature of at least 100° C. whereby a reaction product, insoluble in rosin solvents, of boric acid and color bodies contained in the rosin is produced, dissolving the treated rosin in a solvent therefor, separating the rosin solution from insoluble material, and recovering refined rosin from the solution.

6. The method of refining rosin which includes heating rosin with from 0.01%–3% of its weight of boric acid at a temperature of at least 100° C. whereby a reaction product, insoluble in rosin solvents, of boric acid and color bodies contained in the rosin is produced, dissolving the treated rosin in a solvent therefor, separating the rosin solution from insoluble material, and recovering refined rosin from the solution.

7. The method of refining rosin which includes heating rosin with a solid boron compound at a temperature of at least 100° C. whereby a reaction product, insoluble in rosin solvents, of the boron compound and color bodies contained in the rosin is produced, dissolving the treated rosin in a solvent therefor, separating the rosin solution from insoluble material, and recovering refined rosin from the solution.

8. The method of refining rosin which includes heating rosin with a solid boron compound at a temperature of about 100–225° C. whereby a reaction product, insoluble in rosin solvents, of the boron compound and color bodies contained in the rosin is produced, dissolving the treated rosin in a solvent therefor, separating the rosin solution from insoluble material, and recovering refined rosin from the solution.

9. The method of refining rosin which includes heating rosin with from 0.01%–10% of its weight of a boron compound at a temperature not less than about 100° C. whereby a reaction product insoluble in rosin solvents is produced, dissolving the treated rosin in a solvent therefor, separating the rosin solution from insoluble material, and recovering refined rosin from the solution.

10. The method of refining rosin which includes treating rosin with a boron compound at a temperature not less than about 100° C., dissolving the treated rosin in a solvent therefor, separating the rosin solution from insoluble material, and recovering refined rosin from the solution.

11. The method of refining rosin which includes treating wood rosin with a boron compound at a temperature not less than about 100° C., dissolving the treated rosin in a solvent therefor, separating the rosin solution from insoluble material, and recovering refined wood rosin from the solution.

12. The method of refining rosin which includes heating rosin with a boron compound at a temperature not less than about 100° C., dissolving the treated rosin in a solvent therefor, separating the rosin solution from insoluble material, and recovering refined rosin from the solution.

13. The method of refining rosin which includes heating rosin with a boron compound in an inert atmosphere at a temperature not less than about 100° C., dissolving the treated rosin in a solvent therefor, separating the rosin solution from insoluble material, and recovering refined rosin from the solution.

14. The method of refining rosin which includes heating rosin with from 0.01%–3% of its weight of a boron compound, at a temperature not less than about 100° C., dissolving the treated rosin in a solvent therefor, separating the rosin solution from insoluble material, and recovering refined rosin from the solution.

15. The method of refining rosin which includes treating rosin with a boron compound at a temperature not less than about 100° C., dissolving the treated rosin in a solvent therefor, separating the rosin solution from insoluble material, treating the rosin solution with a selective solvent for color bodies still retained by the rosin, separating the rosin solution from the selective solvent, and recovering refined rosin from the solution.

16. The method of refining rosin which includes treating rosin with a boron compound at a temperature not less than about 100° C., dissolving the treated rosin in a solvent therefor, separating the rosin solution from insoluble material, and further refining the rosin contained in said solution.

17. The method of refining rosin which includes treating rosin with a boron compound at a temperature not less than about 100° C., dissolving the treated rosin in a solvent therefor, separating the rosin solution from insoluble material, recovering rosin from the solution, and subjecting the recovered rosin to distillation.

18. The method of refining rosin which includes treating rosin with a boron compound at a temperature not less than about 100° C., dissolving the treated rosin in a solvent therefor, separating the rosin solution from insoluble material, recovering rosin from the solution, and subjecting the recovered rosin to distillation under reduced pressure.

19. The method of refining rosin which includes treating rosin with a boron compound at a temperature not less than about 100° C., dissolving the treated rosin in gasoline, separating the rosin solution from insoluble material, and recovering refined rosin from the solution.

20. The method of refining rosin which includes treating rosin with a boron compound at a temperature not less than about 100° C., dissolving the treated rosin in gasoline, separating the rosin solution from insoluble material, and further refining rosin contained in said solution.

21. The method of refining rosin which includes treating rosin with a boron compound at a temperature not less than about 100° C., dissolving the treated rosin in gasoline, separating the rosin solution from insoluble material, treating the rosin solution with a selective solvent for color bodies still retained by the rosin, separating the rosin solution from the selective solvent, and recovering refined rosin from the solution.

22. The method of refining rosin which includes treating rosin with a boron compound at a temperature not less than about 100° C., dissolving the treated rosin in gasoline, separating the rosin solution from insoluble material, recovering rosin from the solution, and subjecting the recovered rosin to distillation.

23. The method of refining rosin which includes treating rosin with a boron compound at a temperature not less than about 100° C., separating treated rosin from insoluble material by means of a solvent for the rosin, and recovering refined rosin from the solution.

24. The method of refining rosin which includes treating rosin in solution in a solvent therefor with a boron compound at a temperature not less than about 100° C., removing insoluble material from the solution, and recovering refined rosin therefrom.

25. The method of refining rosin which includes treating rosin with a boron compound at a temperature not less than about 100° C., dissolving the treated rosin in gasoline, separating the rosin solution from insoluble material, treating the rosin solution with furfural, separating the rosin solution from the furfural solution of rosin color bodies, and recovering refined rosin from the rosin solution.

JOSEPH N. BORGLIN.